United States Patent
Koslov et al.

(10) Patent No.: US 7,464,318 B2
(45) Date of Patent: Dec. 9, 2008

(54) ADAPTIVE SOFT DEMODULATION FOR RECEPTION OF DISTORTED SIGNALS

(75) Inventors: Joshua Lawrence Koslov, Hopewell, NJ (US); Kumar Ramaswamy, Princeton, NJ (US); Wen Gao, Plainsboro, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 397 days.

(21) Appl. No.: 10/554,580

(22) PCT Filed: Apr. 24, 2004

(86) PCT No.: PCT/US2004/013733
§ 371 (c)(1),
(2), (4) Date: Oct. 27, 2005

(87) PCT Pub. No.: WO2004/100475
PCT Pub. Date: Nov. 18, 2004

(65) Prior Publication Data
US 2006/0212776 A1 Sep. 21, 2006

Related U.S. Application Data

(60) Provisional application No. 60/467,946, filed on May 5, 2003.

(51) Int. Cl.
*H03M 13/00* (2006.01)
(52) U.S. Cl. .................................. 714/759; 714/780
(58) Field of Classification Search .................. 714/796, 714/780
See application file for complete search history.

(56) References Cited

U.S. PATENT DOCUMENTS

| 4,742,533 | A | 5/1988 | Weidner et al. ............... 375/85 |
| 6,005,897 | A | 12/1999 | McCallister et al. ......... 375/340 |
| 6,119,083 | A * | 9/2000 | Hollier et al. ............... 704/243 |
| 6,275,523 | B1 * | 8/2001 | Chen et al. .................. 375/226 |
| 6,335,954 | B1 * | 1/2002 | Bottomley et al. .......... 375/354 |

(Continued)

FOREIGN PATENT DOCUMENTS

EP 0 465 851 A2 1/1992

OTHER PUBLICATIONS

Authors: W. H. Thesling, F. Xiong and M. J. Vanderaar; Title: Planar approximation for the least reliable bit log-likelihood ratio of 8PS K modulation; Jun 2000; IEE Proc.-Commun., vol. 147, No. 3, pp. 144-148.

(Continued)

*Primary Examiner*—Guy J Lamarre
*Assistant Examiner*—Enam Ahmed
(74) *Attorney, Agent, or Firm*—Joseph J. Laks; Paul P. Kiel; Joseph J. Opalach

(57) ABSTRACT

A satellite communications system comprises a transmitting ground station, including a transmitter and a receiver, a satellite transponder and a receiving ground station. The transmitter transmits an uplink signal to the satellite transponder, which broadcasts the received uplink signal as a downlink signal to the receiving ground station. The transmitting ground station monitors the downlink signal through the receiver and calculates log-likelihood ratios (LLRs) as a function of the monitored downlink signal. These LLRs are illustratively stored in a look-up table, which are then transmitted to the receiving ground station for use in recovering data from a received data signal.

6 Claims, 17 Drawing Sheets

U.S. PATENT DOCUMENTS 6,594,318 B1 * 7/2003 Sindhushayana ............ 375/262
7,006,841 B2 * 2/2006 Monogioudis et al. ...... 455/522
7,099,384 B1 * 8/2006 Jalali et al. .................. 375/229

OTHER PUBLICATIONS

Authors: Teuvo Kohonen, Kimmo Raivio, Olli Simula, Olli Venta and Jukka Henriksson; Title: Combining Linear Equalization and Self-Organizing Adaptation in Dynamic Discrete-Signal Detection: Jun. 1990; pp. 223-228.

Author: Eric Hewitt, Member, IEEE, Advanced Hardware Architectures, Inc.; Title: Turbo Product Codes for LMDS; 1999; pp. 107-111.

Author: A. Springer, A. Gerdenitsch, Z. Li, A. Stelzer and R. Weigel; Title: Adaptive Predistortion for Amplifier Linearization for UMTS Terminals; 2002IEEE; pp. 78-82.

Search Report date Oct. 29, 2004.

* cited by examiner

ADAPTIVE SOFT DEMODULATION FOR RECEPTION OF DISTORTED SIGNALS

This application claims the benefit, under 35 U.S.C. § 365 of International Application PCT/US2004/013733, filed 24 Apr. 2004, which was published in accordance with PCT Article 21(2) on 18 Nov. 2004 in English and which claims the benefit of U.S. provisional patent application No. 60/467,946, filed 5 May 2003.

BACKGROUND OF THE INVENTION

The present invention generally relates to communications systems and, more particularly, to satellite-based communications systems.

Generally speaking, in a satellite communications system a ground station transmits a signal "uplink" to a satellite transponder, which re-transmits the signal "downlink" to a receiving station. One form of satellite communications system employing hierarchical modulation is described in U.S. Pat. No. 5,966,412 issued Oct. 12, 1999 to Ramaswamy. Backward-compatible hierarchical modulation(BCHM) can be used in a satellite system as a way to continue to support existing legacy receivers yet also provide a growth path for offering new services. In other words, a BCEM based satellite system permits additional features, or services, to be added to the system without requiring existing users to buy new satellite receivers. In a hierarchical modulation based communications system, at least two signals, e.g., an upper layer (UL) signal and a lower layer (LL) signal, are added together to generate a synchronously modulated satellite signal for transmission. In the context of a satellite-based communications system that provides backward compatibility, the LL signal provides additional services, while the UL signal provides the legacy services, i.e., the UL signal is, in effect, the same signal that was transmitted before —thus, the satellite transmission signal can continue to evolve with no impact to users with legacy receivers. As such, a user who already has a legacy receiver can continue to use the legacy receiver until such time that the user decides to upgrade to a receiver, or box, that can recover the LL signal to provide the additional services.

In communications systems, error detection/correction codes (and interleavers) are used to improve the reliability of transmission. Such error detection/correction codes includes such techniques as, but not limited to, convolutional codes, trellis codes, a concatenated forward error correction (FEC) scheme, where a rate 1/2, 2/3, 4/5 or 6/7 convolutional code is used as an inner code, and a Reed Solomon code is used as an outer code; LDPC codes (low density parity check codes); etc. For example, in the context of the above-described hierarchical modulation based satellite system, the UL signal is typically encoded using a convolutional code or a short block code; while the LL signal is typically encoded using a turbo code or LDPC code.

In the context of a turbo code or an LDPC, the receiver typically uses an iterative decoding technique such as represented by a soft-input-soft-output (SISO) technique. SISO is typically based upon "soft metrics" such as log-likelihood ratios (LIRs). In general terms, an LLR is related to the probability that a particular received bit (binary digit) value is either a logical "one" or logical "zero." In particular, the transmitter transmits symbols from a predefined signal space, each transmitted symbol having associated therewith a given bits-to-symbol mapping $M(b_i)$, where M are the target symbols and $b_i$; i=0, 1 ... B−1 are the bits to be mapped where B is the number of bits in each symbol. For example, in a 16-QAM (quadrature amplitude modulation) signal space, there are 16 symbols, each symbol mapped to a particular four bit value(B=4). At the receiver, the received signal is processed into a stream of signal points, each signal point residing in the above-mentioned signal space (but not necessarily corresponding to a particular transmitted symbol due to noise). The receiver calculates the LLRs, i.e., the likelihood that a particular bit value was received given a received signal point. In general, the log-likelihood ratio function for the ith bit of the B bit value is calculated as follows:

$$LLR(i, z) = \log\left[\frac{prob(b_i = 1 | z)}{prob(b_i = 0 | z)}\right]; \quad i = 0, 1, \ldots B-1 \quad (1)$$

where, z is the received signal point value. Generally, if the LLR value is positive, the bit is most likely to be a 1; while if the LLR is negative, the bit is most likely to be a zero. The receiver iteratively decodes the received signal using the calculated LLRs.

SUMMARY OF THE INVENTION

We have observed that the above-described LLR calculations at the receiver may be further affected by non-linear distortions in the communications system. For example, the amplitude-to-amplitude (AM-AM) characteristics of a satellite transponder may cause non-linear distortion that effectively further distorts certain ones of the transmitted symbols. In addition, these non-linear distortions may change with time. For example, the characteristics of the AM-AM distortion in the satellite transponder may change with age of the transponder. As such, the LLRs determined by the receiver may be inaccurate. Therefore, and in accordance with the principles of the invention, an endpoint of a communications system receives a signal, determines soft metrics as a function of the received signal and stores the determined soft metrics in a look-up table for use in recovering data from a received data signal.

In an embodiment of the invention, a satellite communications system comprises the following elements: a transmitting ground station, which includes a transmitter and a receiver, a satellite transponder and a receiving ground station. The transmitter transmits an uplink signal to the satellite transponder, which broadcasts the received uplink signal as a downlink signal to the receiving ground station. The transmitting ground station monitors the downlink signal through the receiver and calculates LLRs as a function of the monitored downlink signal. These LLRs are illustratively stored in a look-up table, which are then transmitted to the receiving ground station for use in processing a received data signal for recovery of data therefrom.

In another embodiment of the invention, the endpoint of a communications system is a receiver, which constructs a look-up table of soft metric values. In particular, the receiver receives a training signal from an endpoint and calculates soft metric values as a function of the received training signal. The receiver then stores the calculated soft metric values in the look-up table for use in processing a received data signal for recovery of data therefrom.

DETAILED DESCRIPTION

Other than the inventive concept, the elements shown in the figures are well known and will not be described in detail. Also, familiarity with satellite-based systems is assumed and is not described in detail herein. For example, other than the inventive concept, satellite transponders, downlink signals, symbol constellations, a radio-frequency (rf) front-end, or receiver section, such as a low noise block downconverter, formatting and source encoding methods (such as Moving Picture Expert Group (MPEG)-2 Systems Standard (ISO/IEC 13818-1)) for generating transport bit streams and decoding methods such as log-likelihood ratios, soft-input-soft-output (SISO) decoders, Viterbi decoders are well-known and not described herein. In addition, the inventive concept may be implemented using conventional programming techniques, which, as such, will not be described herein. Finally, like-numbers on the figures represent similar elements. It should be noted that as used herein, the term "data signal" refers to any type of data-bearing signal that conveys information in one, or more forms, such as but not limited to, audio, video, images, control information, data, etc.

Figure 1:
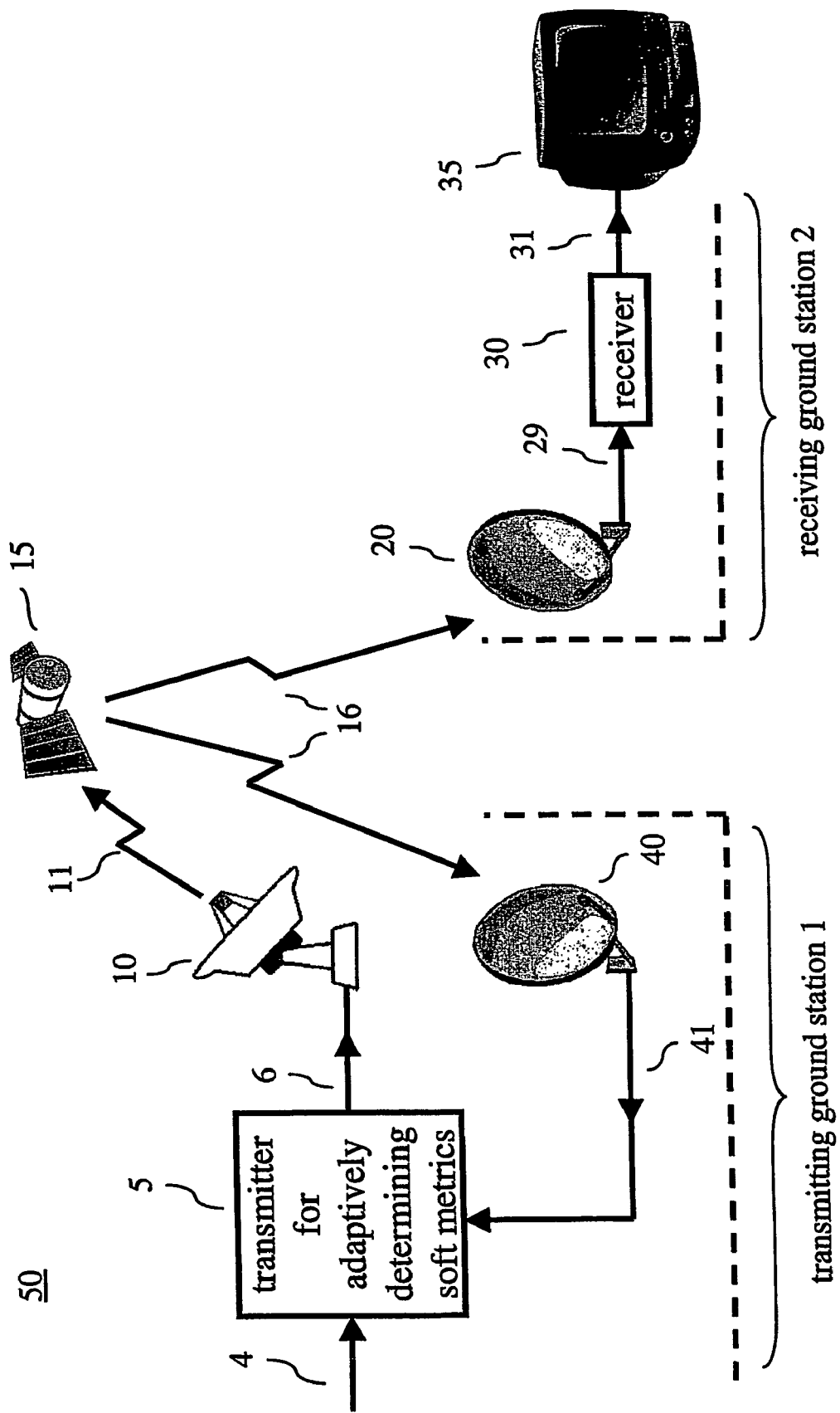
FIG. 1 shows an illustrative satellite communications system embodying the principles of the invention.

An illustrative communications system 50 in accordance with the principles of the invention is shown in FIG. 1. Communications system 50 includes transmitting ground station 1, satellite 15, receiving ground station 2 and television (TV) set 35. Although described in more detail below, the following is a brief overview of communications system 50. Transmitting ground station 1 comprises transmitter 5, transmitting antenna 10 and receiving antenna 40. It should be noted that transmitting ground station 1, receiving ground station 2, transmitter 5, receiver 30 and satellite 15 can be viewed as endpoints of the communications system on the respective paths, e.g., satellite 15 is an endpoint of the path between satellite 15 and transmitter 5, similarly, receiver 30 of receiving ground station 2 is an endpoint of the path between transmitter 5 and receiving ground station 2 (and through satellite 15).

Figure 2:
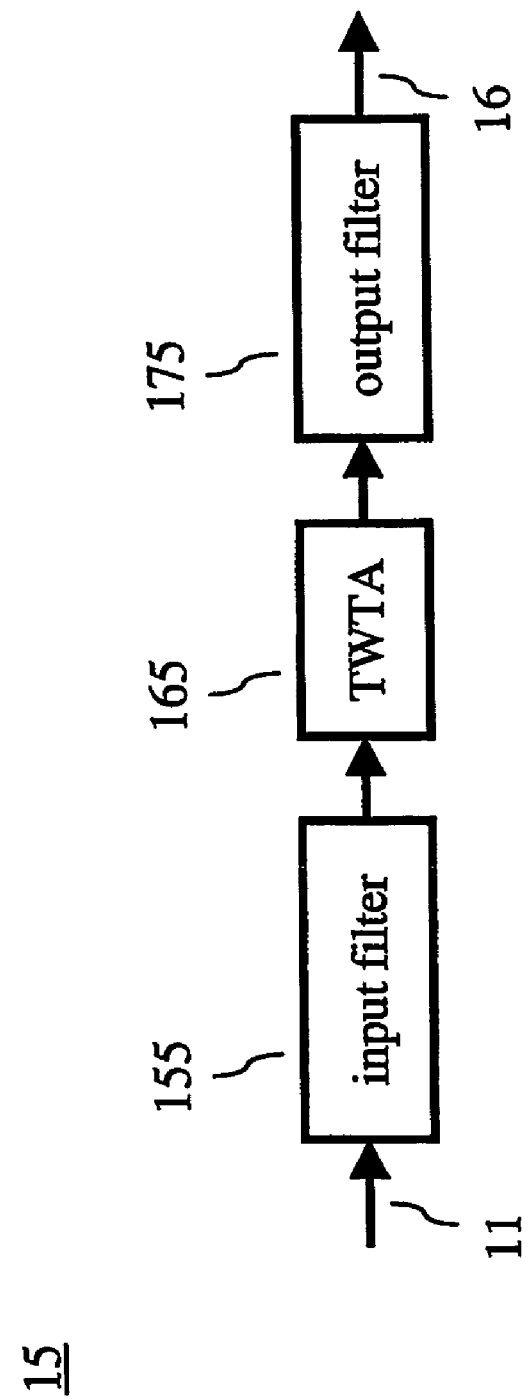
FIG. 2 shows an illustrative block diagram of a transmission path through satellite 15 of FIG. 1.

Transmitter 5 receives data signal 4 (representative of one or more data streams) and provides a modulated signal 6. Illustratively, these data streams represent control signaling, content (e.g., video), etc., of a satellite TV system and may be independent of each other or related to each other, or a combination thereof. Transmitting antenna 10 provides modulated signal 6 as uplink signal 11 to satellite 15. Referring briefly to FIG. 2, an illustrative block diagram of the transmission path through satellite 15 for a signal is shown. Satellite 15 includes an input filter 155, a traveling wave tube amplifier (TWTA) 165 and an output filter 175. The uplink signal 11 is first filtered by input filter 155, then amplified for retransmission by TWTA 165. The output signal from TWTA 165 is then filtered by output filter 175 to provide downlink signal 16 (which is typically at a different frequency than the uplink signal). As such, satellite 15 provides for retransmission of the received uplink signal via downlink signal 16 to a broadcast area. This broadcast area typically covers a predefined geographical region, e.g., a portion of the continental United States as represented by receiving ground station 2. Returning to FIG. 1, receiving ground station 2 comprises receiving antenna 20 and receiver 30. Receiving antenna 20 receives downlink signal 16 and provides a received signal 29 to receiver 30, which demodulates and decodes received signal 29 to provide, e.g., content to TV 35, via signal 31, for viewing thereon.

As noted earlier, the transmission characteristics of satellite 15 may further distort the signal (e.g., the above-noted AM-AM distortion of, e.g., TWTA 165 of FIG. 2) and, further, these transmission characteristics may change over time. Therefore, and in accordance with the principles of the invention, transmitter 5 monitors downlink signal 16 via receiving antenna 40 and received signal 41 for adaptively, or dynamically, adjusting soft metrics values, which are for use in a receiver for processing a received data signal to recover data therefrom.

Figure 3:
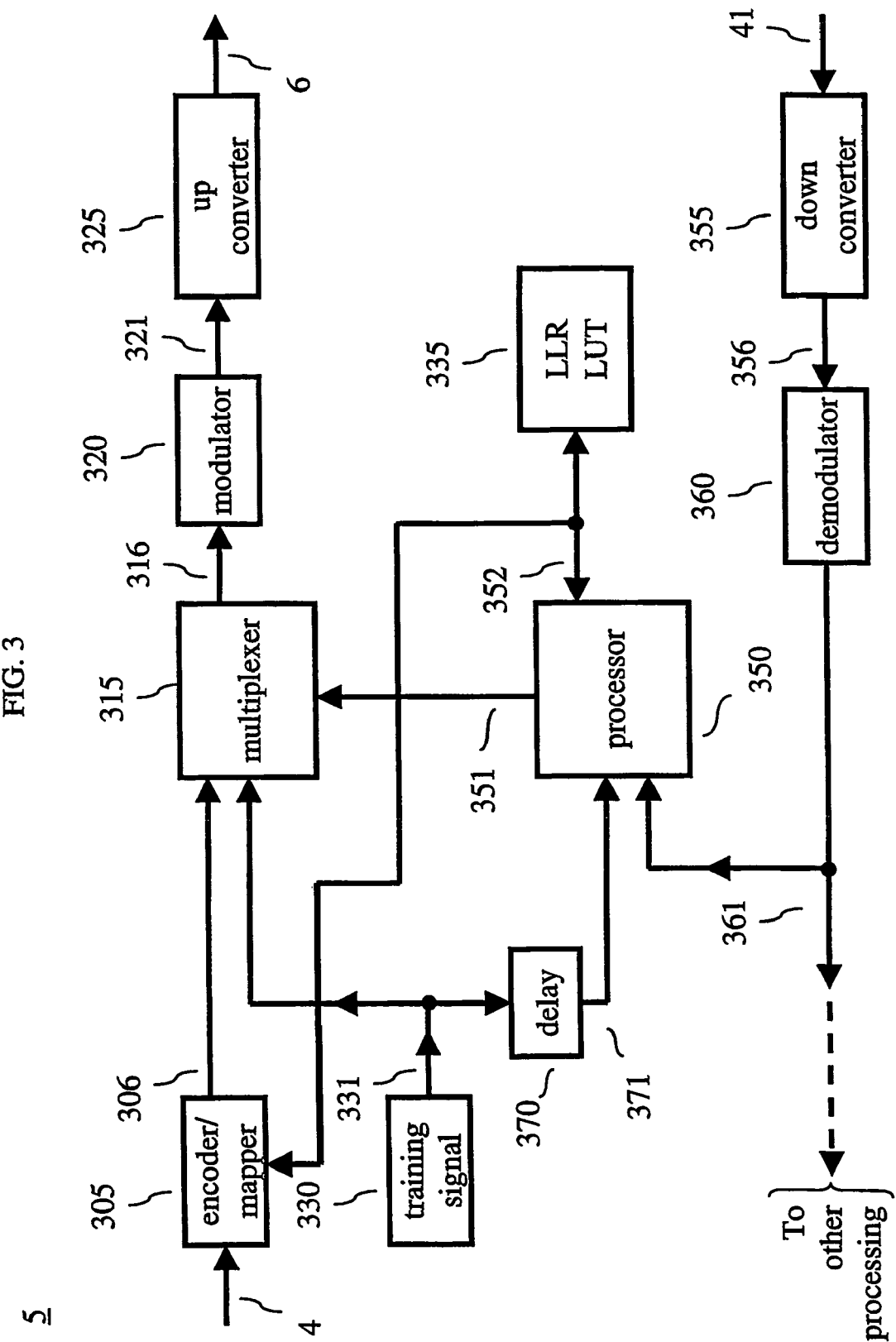
FIG. 3 shows an illustrative embodiment in accordance with the principles of the invention for use in transmitting ground station 1 of FIG. 1.

Turning now to FIG. 3, an illustrative embodiment of transmitter 5 in accordance with the principles of the invention is shown. Transmitter 5 (also referred to herein as a modulator, since transmitter 5 includes both modulation and demodulation functions) comprises encoder/mapper 305, multiplexer 315, modulator 320, up converter 325, log-likelihood ratio look-up table (LLR LUT) 335, down converter 355, demodulator 360, training signal generator 330, delay element 370 and processor 350. The latter is a stored-program control processor, e.g., one or more microprocessors or one or more digital signal processors (DSPs) and includes memory (not shown). A data signal 4 is applied to encoder/mapper 305, which implements known error detection/correction codes. Illustratively, at least a portion of encoder/mapper 305 implements a coding scheme such that a corresponding receiver performs SISO decoding. For example, encoder/mapper 305 implements a turbo code, LDPC, etc. In addition, a convolutional interleaver (not shown) may also be used. It is assumed that encoder/mapper 305 provides a sequence of symbols 306, each symbol selected from a predefined signal space or symbol constellation (not shown). Illustratively, the sequence of symbols 306 occurs at a symbol rate 1/T. Ignoring for the moment signals 331 and 352, this sequence of symbols is applied to multiplexer 315. The multiplexer output symbol sequence (signal 316) is applied to modulator 320. Modulator 320 provides a modulated signal 321 to up converter 325, which further provides modulated signal 6 at the appropriate transmission frequency.

Figure 4:
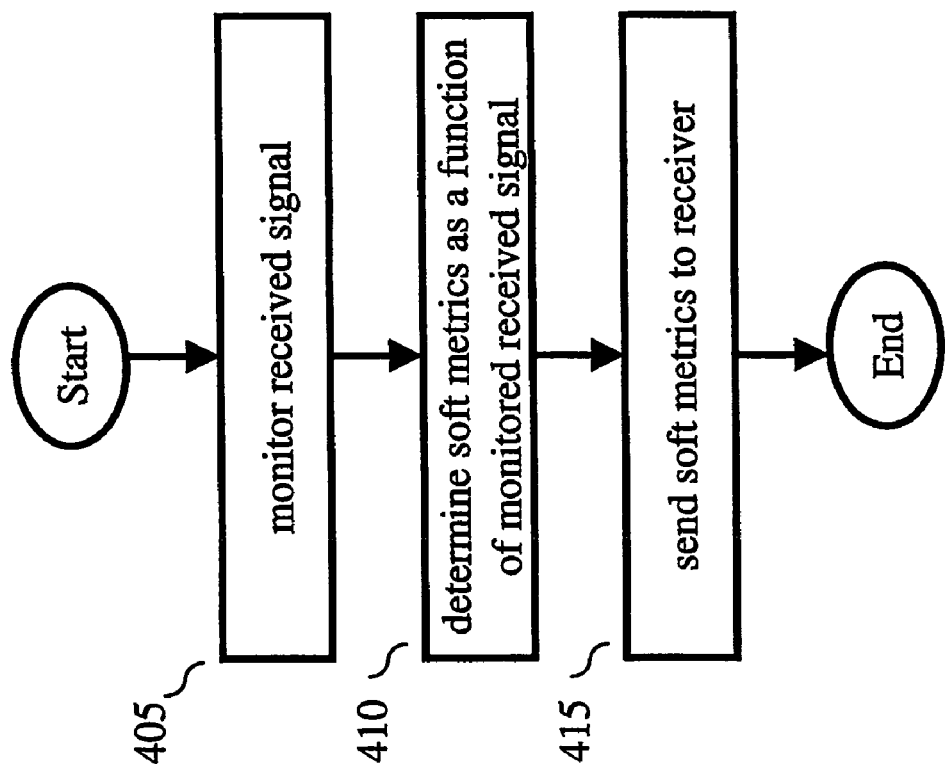
FIGS. 4 and 5 show illustrative flow charts in accordance with the principles of the invention.

In accordance with the principles of the invention, transmitter 5 adaptively, or dynamically, determines LLRs for use by a receiver in recovering data from a received data signal. Reference at this time should also be made to FIG. 4, which shows an illustrative method for use in the apparatus of FIGS. 1 and 3. In step 405, transmitter 5 monitors a received signal, here illustrated by received signal 41 of FIG. 3. In step 410, transmitter 5 determines LLRs as a function of the monitored received signal. Illustratively, transmitter 5 stores the calculated LLRs in LLR LUT 335 of FIG. 3. In step 415, transmitter 5 sends, via, e.g., encoder/mapper 305, the contents of the LLR LUT to a receiver (e.g., receiver 30 of FIG. 1) for use therein. It should be noted that the contents of LLR LUT 335 may be sent via a different encoder/mapper or out-of-band channel.

One type of illustrative received signal that can be used in accordance with the principles of the invention is a training signal. As known in the art, a training signal is a predefined signal, e.g., a predefined symbol sequence that is known a priori to the elements of a communications system. In this regard, the embodiment of FIG. 3 has a number of operating modes, two of which are a training mode and a data mode. In the data mode, transmitter 5 encodes and transmits data as described above. However, in the training mode, transmitter 5 transmits a training signal for dynamically determining the LLRs stored in LLR LUT 335. Processor 350 stores the LLRs in LLR LUT 335 via signal 352.

Figure 5:
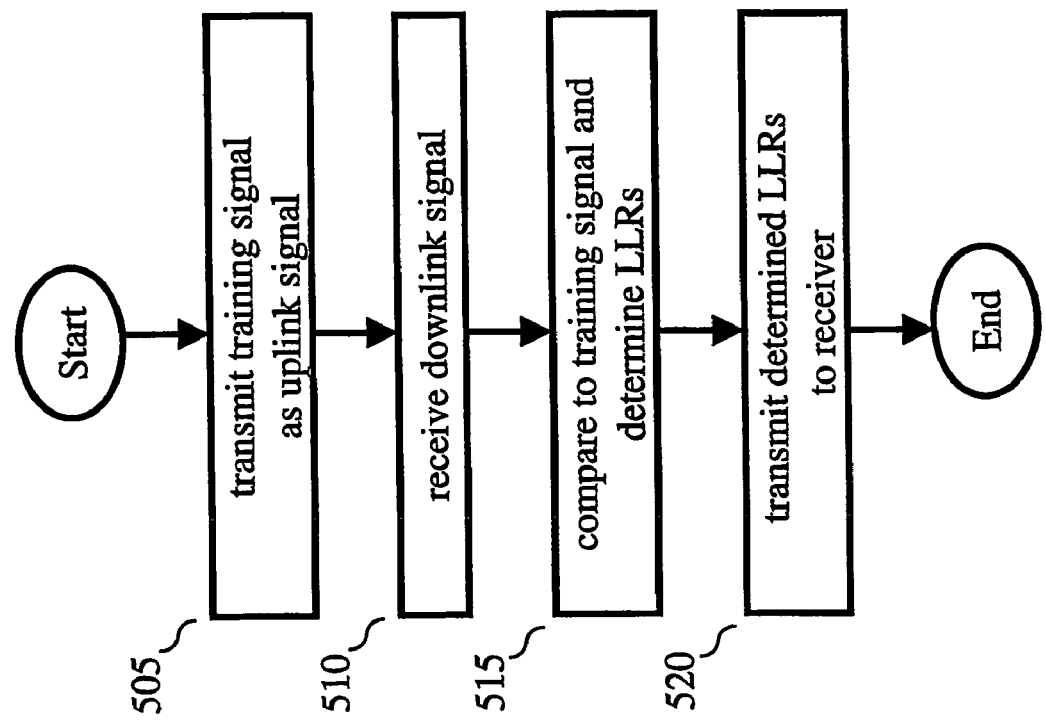

The training mode of transmitter 5 can be executed periodically, e.g., at a certain time of the day, week, or year; aperiodically, e.g., when certain events occur, e.g., initiation of transmission; or even continuously (described further below). At this time, reference should also be made to FIG. 5, which shows an illustrative method for use in transmitter 5 in the training mode. In step 505, transmitter 5 transmits a training signal uplink to satellite 15.

Figure 6:
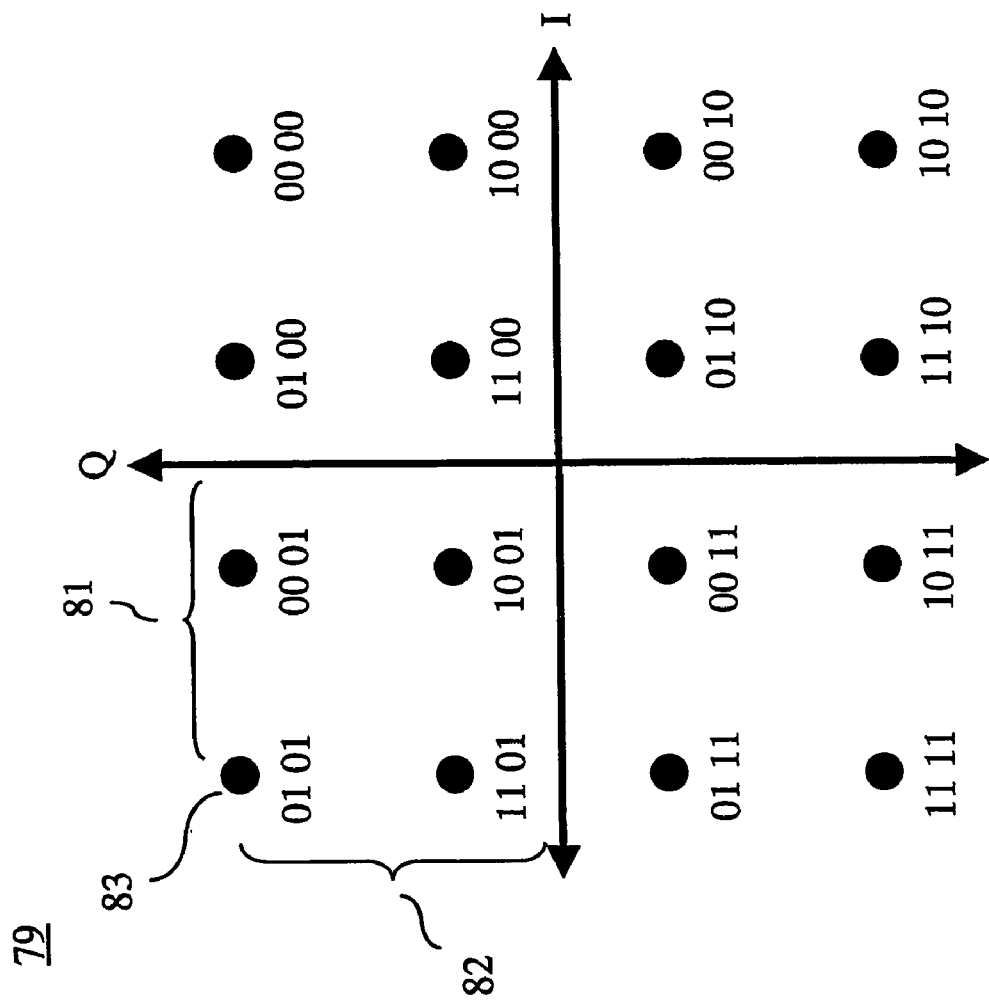
FIGS. 6-10 show various illustrations of a signal space.

Referring back to FIG. 3, processor 350, via signal 351, causes transmission of training signal 331 via multiplexer 315. Training signal 331 is provided by training signal generator 330 and is any predefined symbol sequence. Preferably, the training signal is a predefined sequence that encompasses all of the symbols of the symbol constellation. For example, if the symbol constellation of FIG. 6 is used, the training sequence includes all 16 symbols each of which has an inphase (I) component and a quadrature (Q) component as represented by symbol 83, which has an I component 81 and a Q component 82 in signal space 79. As such, and returning to FIG. 3, signal 331 is representative of a sequence of training symbols, which are applied to multiplexer 315 for uplink transmission to satellite 15 via up converter 325. In step 510 of FIG. 5, transmitter 5 receives received signal 41, which is representative of downlink signal 16 from satellite 15 of FIG. 1. Received signal 41 (i.e., the downlink signal) now includes the training signal albeit altered by any non-linear characteristics of the communications channel. Down converter 355 down-converts and filters received signal 41 to provide a near base-band signal 356 (in the digital domain) to demodulator 360. As such, it is assumed that down converter 355 includes an analog-to-digital converter (not shown). Demodulator 360 demodulates near base band signal 356 to provide a sequence of received symbols 361, i.e., the received training signal.

As can be observed from FIG. 3, training signal 331 is also applied to delay element 370, which compensates for the processing, transmission and downlink delays such that a transmitted training symbol is compared by processor 350 to the corresponding received training symbol via signals 371 and 361, respectively. As such, in step 515 of FIG. 5, processor 350 calculates LLRs as a function of the received signal z and the respective target symbol and stores the calculated LLRs in LLR LUT 335. Upon completion of training, processor 350 causes the LLR data contents of LLR LUT 335 to be transmitted to a receiver, e.g., receiver 30 of FIG. 1, in step 520. With respect to determining when training is completed, any one of a number of techniques may be used. For example, training is completed after a predetermined amount of time and/or after N sequences of the training signal have been transmitted, where N>0, etc. Also, it should be observed in FIG. 3 that transmitter 5 may also provide the sequence of received symbols 361 to other processing equipment (not shown) for recovery of other data or further use of the training signal. It should be noted that if data symbols 306 or combined data and training symbols 316 are applied to delay element 370, then by comparing signals 371 and 361 LLR values can be calculated without the necessity of a predefined training sequence: that is, the normal data symbols will eventually encompass all of the symbols of the constellation. It should also be noted that received symbols may be sliced such that the received symbols 361 are compared to their sliced values for the LLR calculation, rather than to the delayed transmitted symbols 371, thereby eliminating the need for delay element 371. It should also be noted that if a training sequence is used, the sequence 371 of transmitted symbols may be reconstructed by correlating the received symbols 361 with the known training sequence, thereby eliminating the need for delay element 370. It should also be noted that a predistorter may be imposed following multiplexer 315 to pre-compensate for nonlinear satellite distortions, and that the same pairs of received symbols and delayed transmitted or sliced or reconstructed received symbols can be used in training a predistorter as well as training the LLR table.

Figure 7:
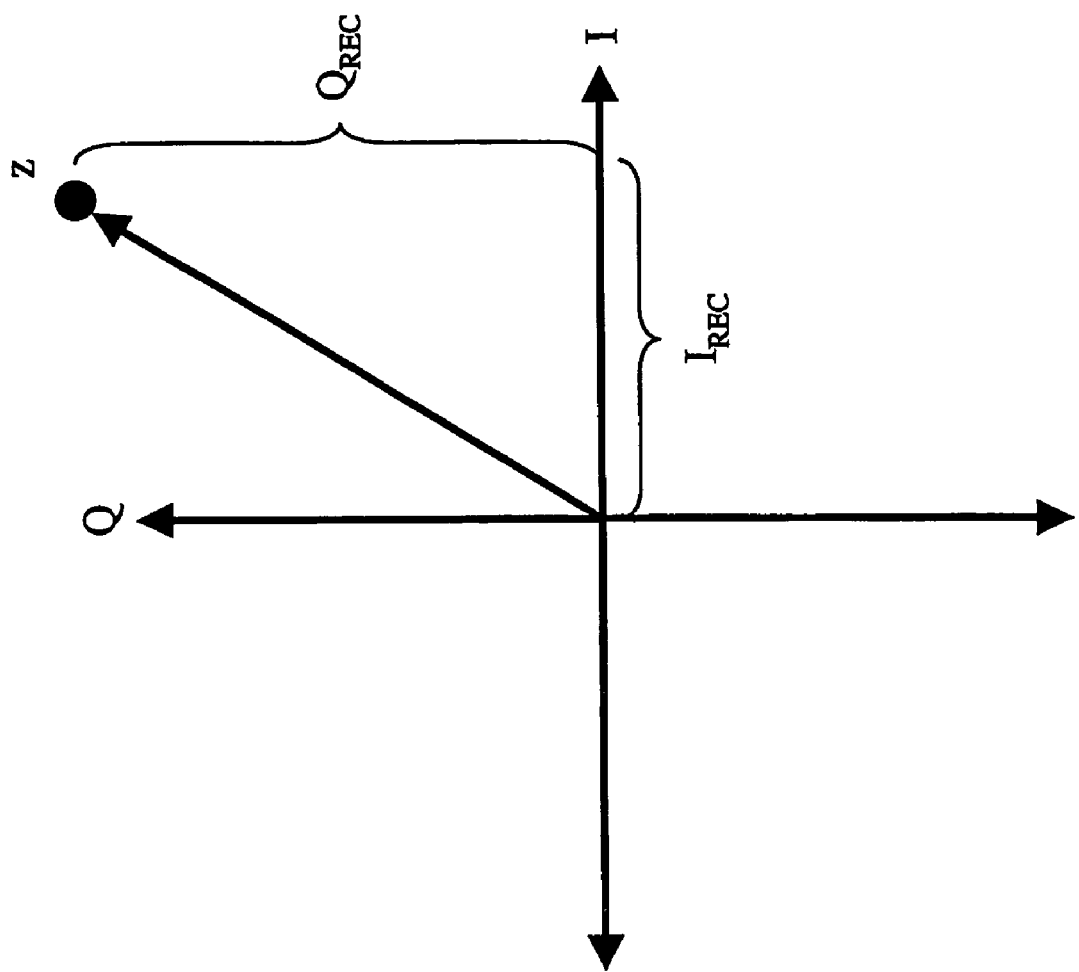

With respect to determining the LLRs, each received signal point of the sequence of received signal points 361 includes an inphase (I) component and a quadrature (Q) component in a signal space. This is further illustrated in FIG. 7 for a received signal point z, where:

$$z = I_{REC} + jQ_{REC}. \tag{2}$$

Other than the inventive concept, and as known in the art, for a given bit-to-symbol mapping $M(b_i)$, where M are the target symbols and $b_i$; i=0, 1 ... B−1 are the bits to be mapped where B is the number of bits in each symbol (e.g., B equals two bits for QPSK, three bits for 8-PSK, etc.), the log-likelihood ratio function for the i-th bit is defined in equation (1), above, and repeated below:

$$LLR(i, z) = \log[(\text{prob}(b_i=1|z))/(\text{prob}(b_i=0|z))]; \tag{3}$$

where $b_i$ is the i-th bit and z is the received signal point in the signal space. The notation "prob $(b_i=1|z)$" represents the probability that the i-th bit is a "1" given that the signal point z was received. Similarly, the notation "prob$(b_i=0|z)$" represents the probability that the i-th bit is a "0" given that the signal point z was received.

For a two-dimensional signal space, the probabilities within equation (3) are assumed to be based upon additive Gaussian white noise (AWGN) having a probability density function (PDF) of:

$$prob(n) = \frac{\exp\left(\frac{-|n|^2}{2\sigma^2}\right)}{2\pi\sigma^2}. \tag{4}$$

Therefore, the LLR for a given bit and received signal point are defined as:

$$LLR(i, z) = \log\left[\frac{\sum_{M_{bit\,i=1}} \exp\left(\frac{-|z-M|^2}{2\sigma^2}\right)}{\sum_{M_{bit\,i=0}} \exp\left(\frac{-|z-M|^2}{2\sigma^2}\right)}\right]. \tag{5}$$

It can be observed from equation (5) that the LLR for a given received signal point z is a function of z, the target symbols M, and the rms noise level σ.

Figure 8:
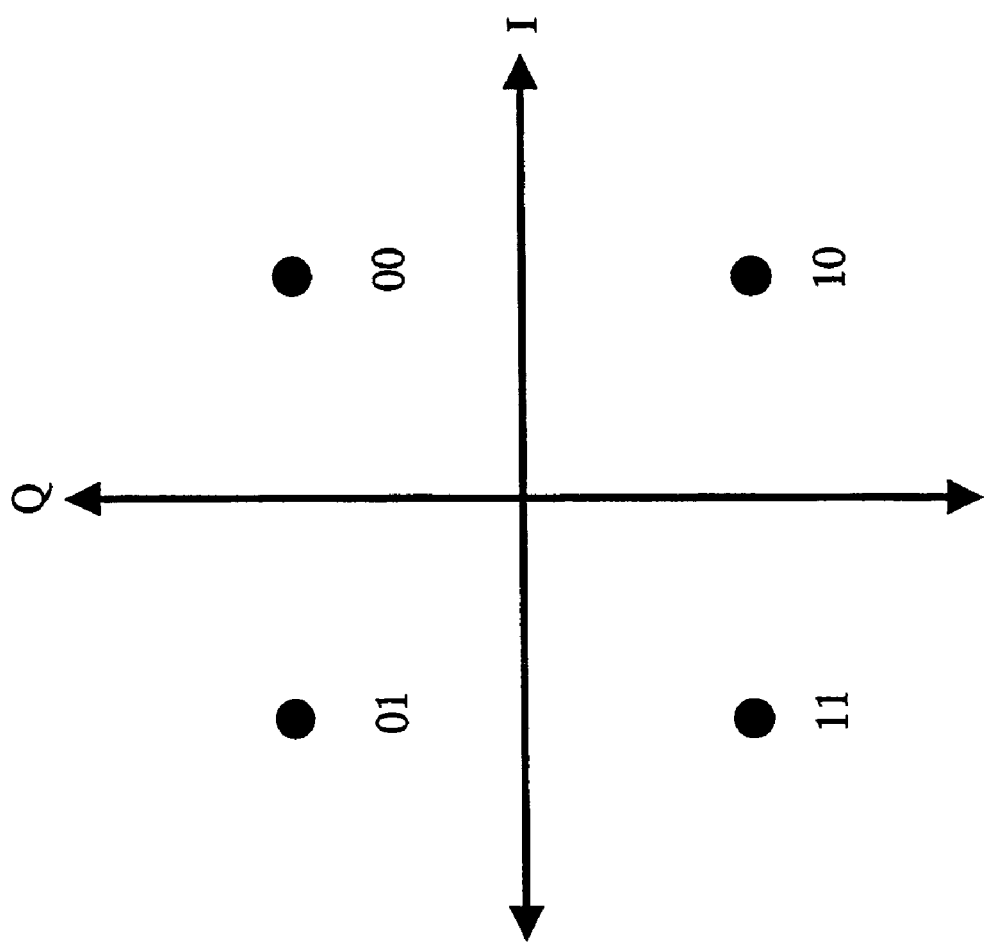
Figure 9:
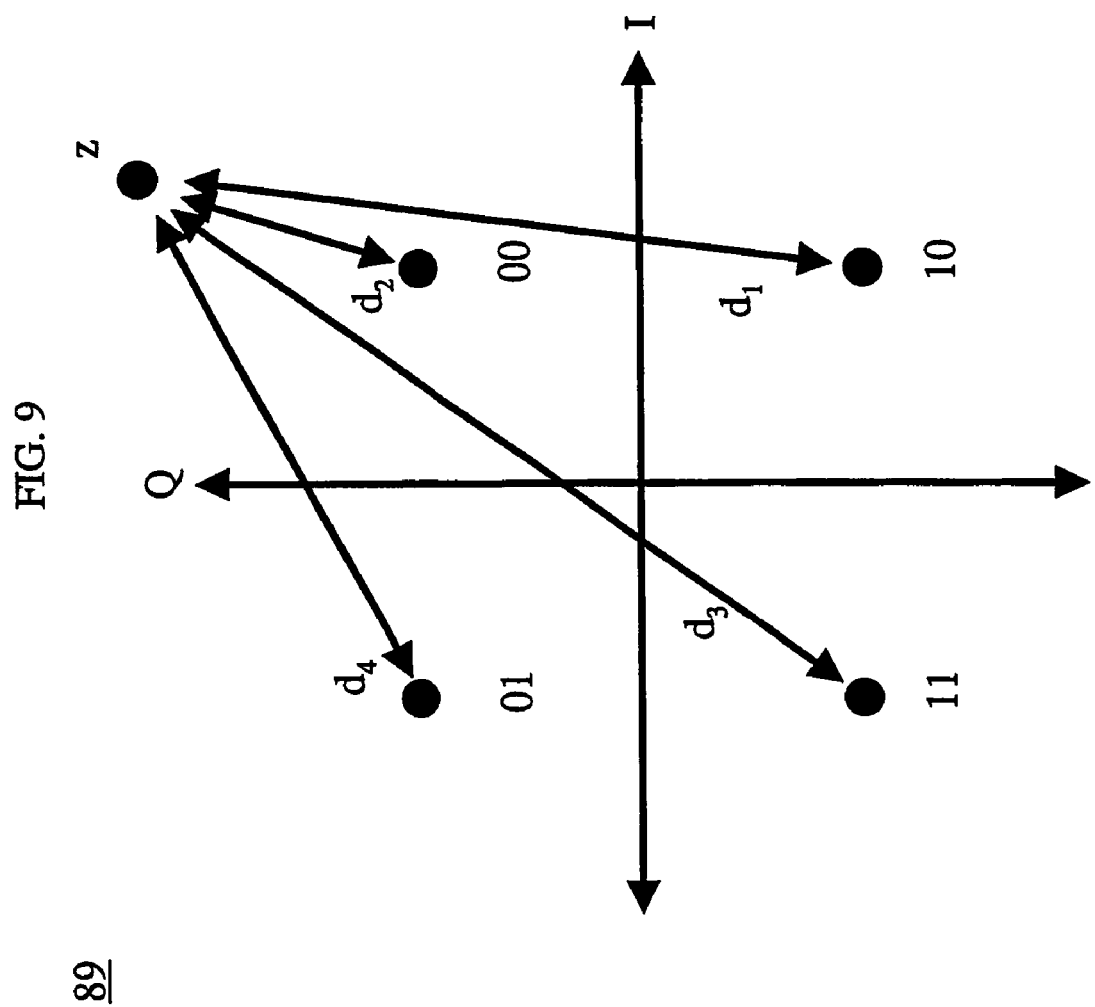

A pictorial illustration of the calculation of an LLR ratio is shown in FIG. 9 for the illustrative symbol constellation shown in FIG. 8. For simplicity, a 4 symbol QPSK (quadrature phase shift keyed) constellation is shown in FIG. 8, however, it should noted that other sizes and shapes of symbol constellations could also have been used, e.g., 3 bits for 8-PSK, 4 bits for 16-QAM, a hierarchical 16-QAM, etc. As can be observed from FIG. 8, there are four symbols in the signal space 89, each symbol associated with a particular two bit mapping [b1, b0]. Turning now to FIG. 9, a received signal point z is shown in relation to the symbols of signal space 89. It can be observed from FIG. 9 that the received signal point z is located at different distances $d_i$ from each of the symbols of signal space 89. For example, the received signal point z is located a distance $d_4$ from the symbol associated with the two bit mapping "01." As such, the LLR(b0) is:

$$\ln [(\text{probability b0 is one})/(\text{probability b0 is zero})]; \text{ or} \quad (5A)$$

$$\ln [(\text{probability}(\text{symbol 01 or 11}))/(\text{probability}(\text{symbol 00 or 10}))]; \text{ or} \quad (5B)$$

$$\ln [\{ \exp(-d_4^2/(2\sigma^2)) + \exp(-d_3^2/(2\sigma^2)) \}/\{ \exp(-d_2^2/(2\sigma^2)) + \exp(-d_1^2/(2\sigma^2)) \}]. \quad (5C)$$

while the LLR(b1) is:

$$\ln [(\text{probability b1 is one})/(\text{probability b1 is zero})]; \text{ or} \quad (6A)$$

$$\ln [(\text{probability } (\text{symbol 10 or 11}))/(\text{probability } (\text{symbol 00 or 01}))]; \text{ or} \quad (6B)$$

$$\ln [\{ \exp(-d_1^2/(2\sigma^2)) + \exp(-d_3^2/(2\sigma^2)) \}/\{ \exp(-d_2^2/(2\sigma^2)) + \exp(-d_4^2/(2\sigma^2)) \}]. \quad (6C)$$

Figure 10:
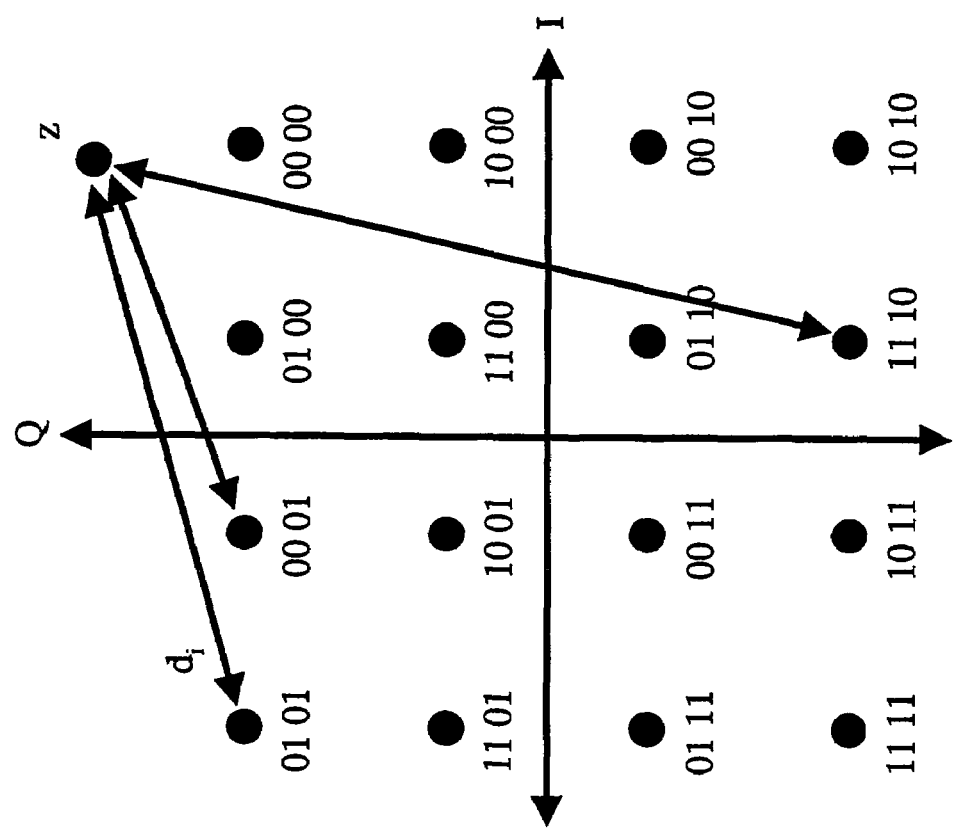

A similar pictorial representation of an LLR is shown in FIG. 10 for signal space 79 (described earlier). For simplicity, only some of the distances, $d_i$, for a particular received signal point, z, are shown in FIG. 10.

Figure 11:
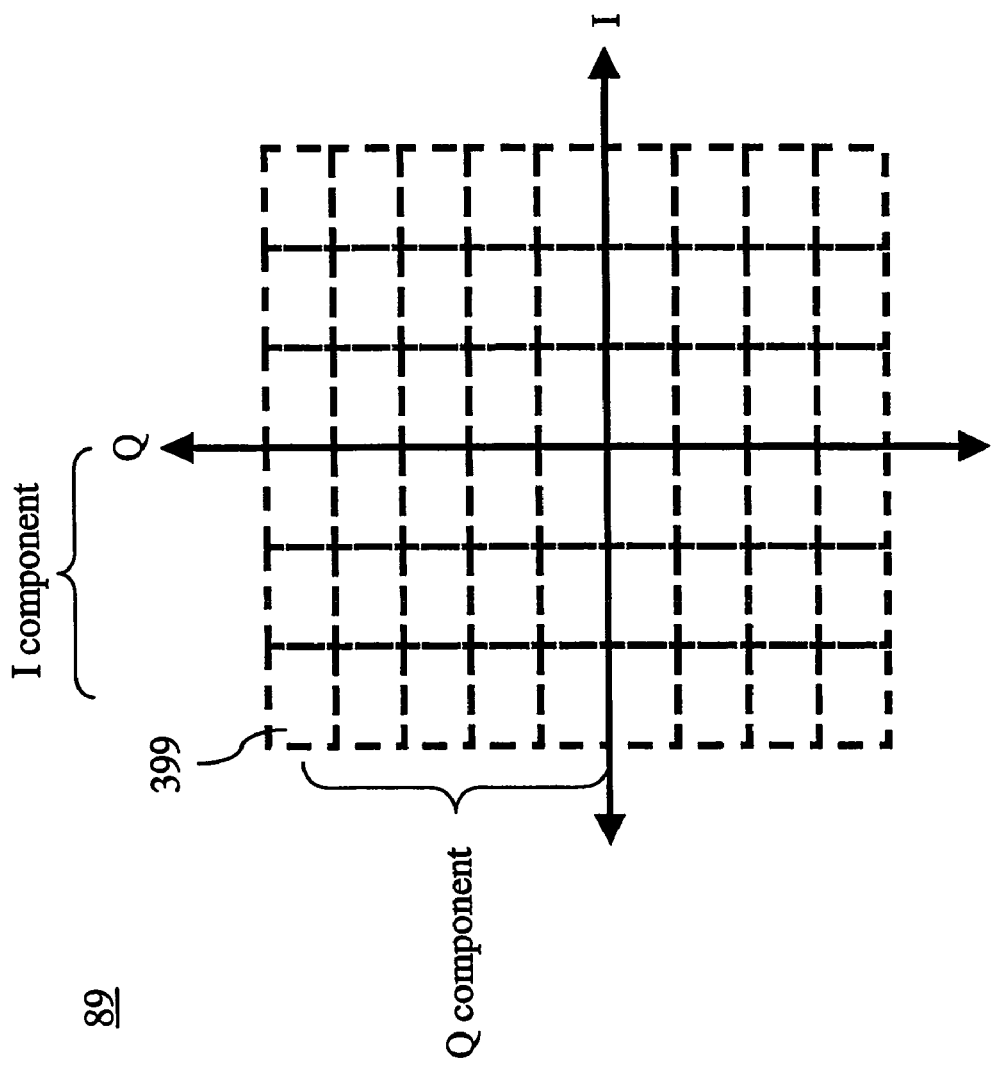
FIGS. 11 and 12 illustrate a LLR LUT in accordance with the principles of the invention.
Figure 12:
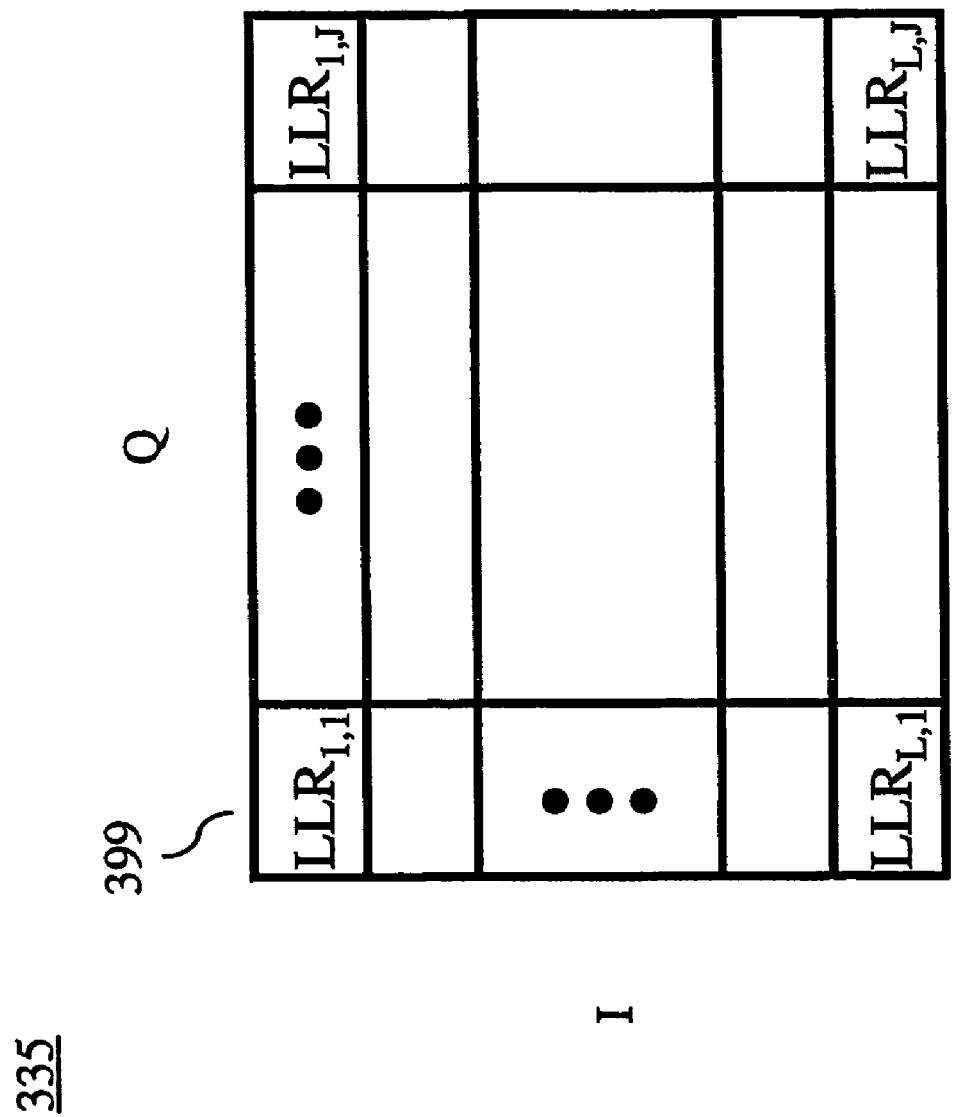

In determining the LLRs, Processor 350 effectively divides the signal space into a number of regions. This is illustrated in FIG. 11. As can be observed from FIG. 11, a signal space, e.g., signal space 89, is divided, or quantized, into a number of regions, each region identified by a particular I component and Q component as represented by region 399. For each region, processor 350 determines an associated LLR and stores this LLR into LLR LUT 335. An illustrative structure for LLR LUT 335 is shown in FIG. 12. In particular, each row of LLR LUT 335 is associated with a particular I component value (an I row value), while each column of LLR LUT 335 is associated with a particular Q component value (a Q column value). LLR LUT 335 has L rows and J columns. As illustration, the LLR determined for region 399 is mapped into LLR LUT 335 as shown in FIG. 11. It should be noted that in this example processor 350 further maps or translates the coordinate system of the signal space into the respective row and column addresses of LLR LUT 335.

Figure 13:
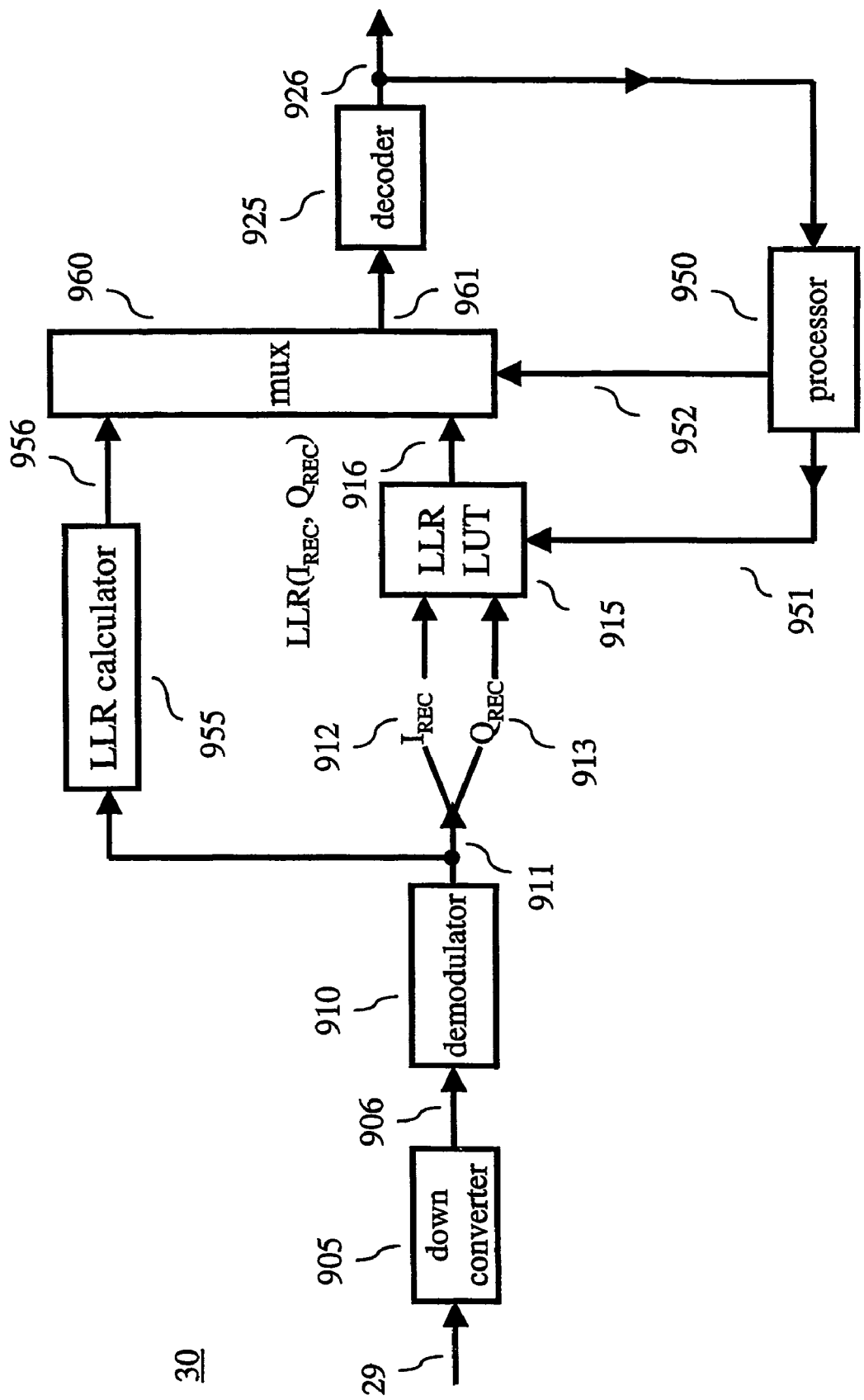
FIG. 13 shows an illustrative embodiment in accordance with the principles of the invention for use in receiver 30 of FIG. 1.

Turning now to FIG. 13, an illustrative portion of receiver 30 in accordance with the principles of the invention is shown. Receiver 30 includes down converter 905, demodulator 910, LLR LUT 915, LLR calculator 955, multiplexer (mux) 960, decoder 925 and processor 950. The latter is a stored-program control processor, e.g., one or more microprocessors or one or more digital signal processors (DSPs) and includes memory (not shown). The operation of receiver 30 is first described in the context of receiving data, e.g., video content, for viewing on TV set 35. In this regard, processor 950 sets mux 960, via signal 952, such that the output signal from LLR LUT 915, signal 916, is applied to decoder 925 via signal 961. With respect to the received signal 29, down converter 905 down-converts and filters received signal 29 to provide a near base-band signal 906 (in the digital domain) to demodulator 910. As such, it is assumed that down converter 905 includes an analog-to-digital converter (not shown). Demodulator 910 demodulates near base band signal 906 to provide a sequence of received signal points 911. As noted above from equation (2), each received signal point, z, has an associated I component ($I_{REC}$) and Q component ($Q_{REC}$). These components (signals 912 and 913 of FIG. 13) are used as indexes or addresses into LLR LUT 915. In particular, in each signaling interval, T, each received signal point is applied to LLR LUT 915, the structure of which is identical to LLR LUT 335 as illustrated in FIG. 12 and the values of which have been set by processor 950, as described below. Each received signal point is quantized into a corresponding I and Q component associated with a particular region of the signal space where the received signal point falls (recall FIG. 11, above) and mapped to the corresponding column and row of LLR LUT 915 (see FIG. 12, above) for selecting therefrom a respective precomputed LLR, i.e., LLR ($I_{REC}$, $Q_{REC}$). Each symbol interval, T, the selected LLR is provided via signal 916 to decoder 925. For example, if z falls into region 399 of the signal space illustrated in FIG. 11, then the $I_{REC}$ component value of signal 911 is quantized (and mapped) to the first row and the $Q_{REC}$ component value of signal 911 is quantized (and mapped) to the first column of LLR LUT 915 (as illustrated in FIG. 12) and the LLR stored thereat is selected and provided via signal 916 to decoder 925 of FIG. 13. Decoder 925 operates on the LLR values applied thereto and acts in a complementary fashion to corresponding 305 of transmitter 5 for decoding the sequence of received signal points 911 to provide decoded signal 926. Data from signal 926 is provided to TV set 35 via signal 31. (In this regard, receiver 30 may additionally process the data before application to TV set 35 and/or directly provide the data to TV set 35.)

Figure 14:
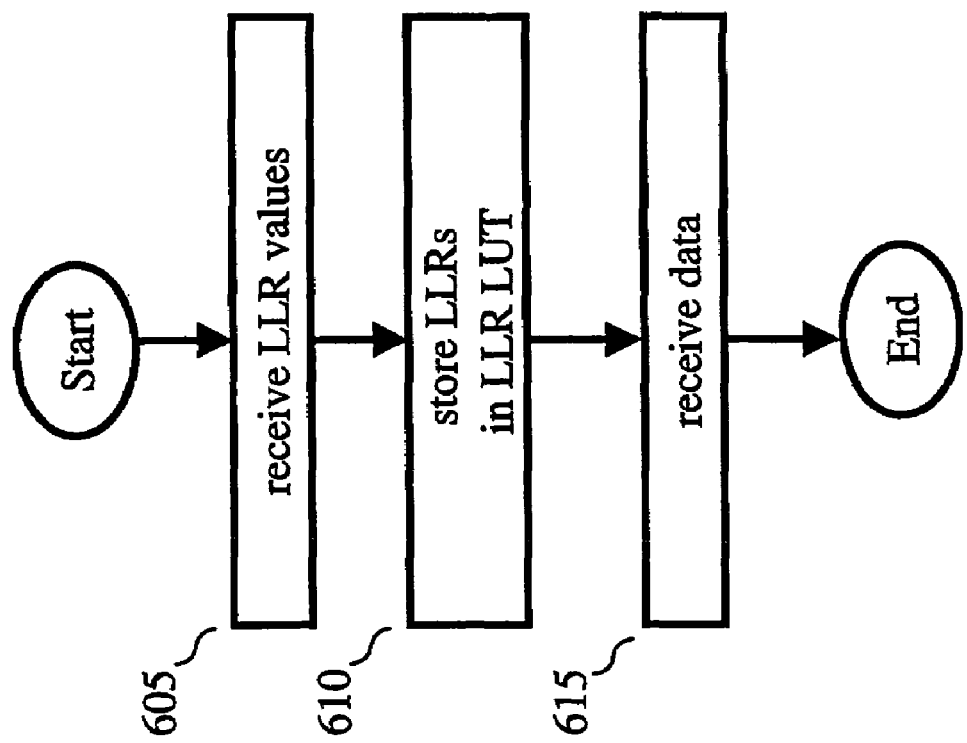
FIG. 14 shows an illustrative flow chart in accordance with the principles of the invention for use in receiver 30 of FIG. 1.

As noted above, and in accordance with the principles of the invention, processor 950 sets the values of LLR LUT 915. An illustrative method for use in receiver 30 for setting the values of LLR LUT 915 is shown in FIG. 14. For setting the values of LLR LUT 915, processor 950 sets mux 960 such that the LLR values processed by decoder 925 are received from LLR calculator 955. The latter functions as in the prior art and calculates LLR values for respective received signal points. In step 605, processor 950 receives the LLR values from transmitter 5 via received signal 29. This can be accomplished as part of an initialization sequence, training process or re-start. The LLR values are provided from decoder 925 to processor 950, which sets LLR LUT 915 via signal 951 in step 610. In step 615, processor 950 configures receiver 30 to begin receiving data and sets mux 960 such that the LLR values used by decoder 925 are provided by LLR LUT 915.

Figure 15:
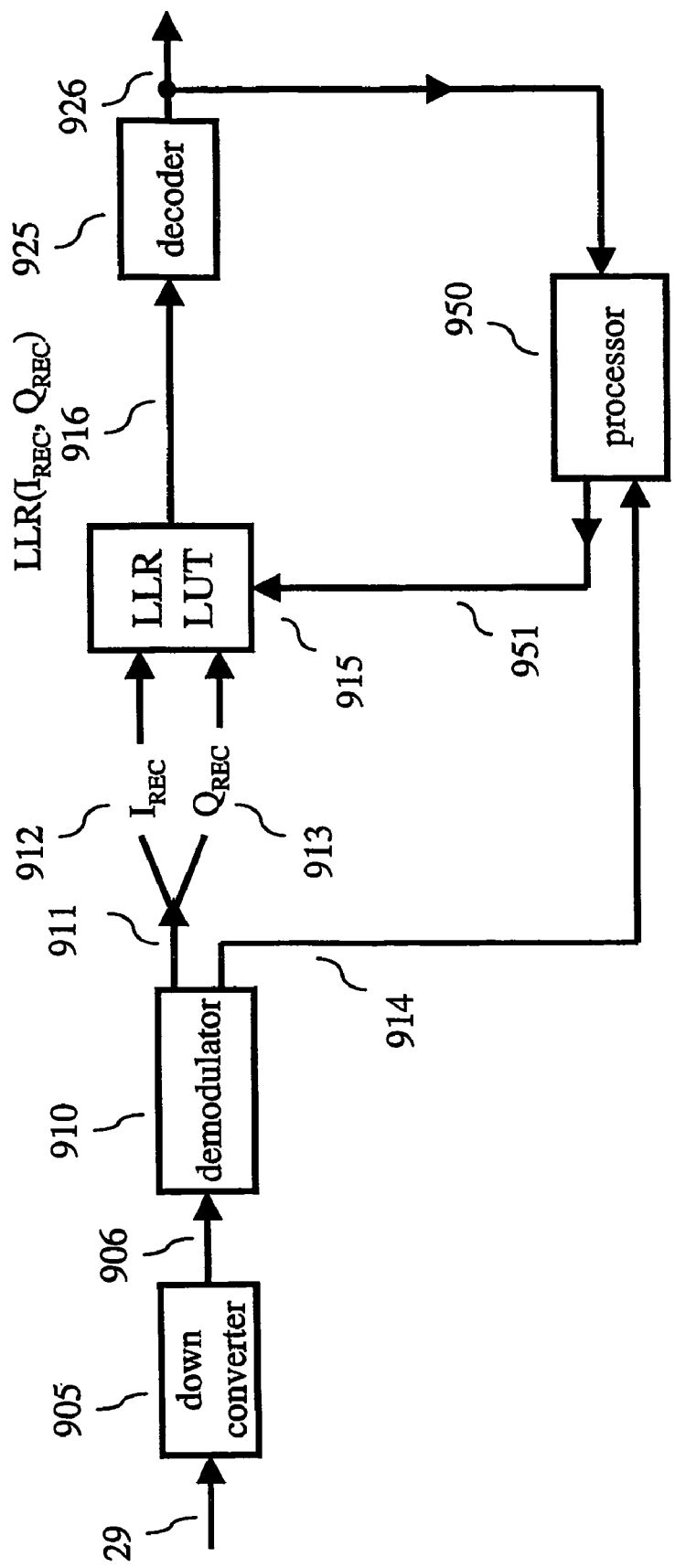
FIG. 15 shows another illustrative embodiment in accordance with the principles of the invention for use in receiver 30 of FIG. 1.

Another embodiment of a receiver in accordance with the principles of the invention is shown in FIG. 15. This embodiment is similar to the one described above with respect to FIG. 13 except that it is assumed that an inband or out-of-band signaling channel is directly available to processor 950, via signal 914, for initialization of LLR LUT 915.

Figure 16:
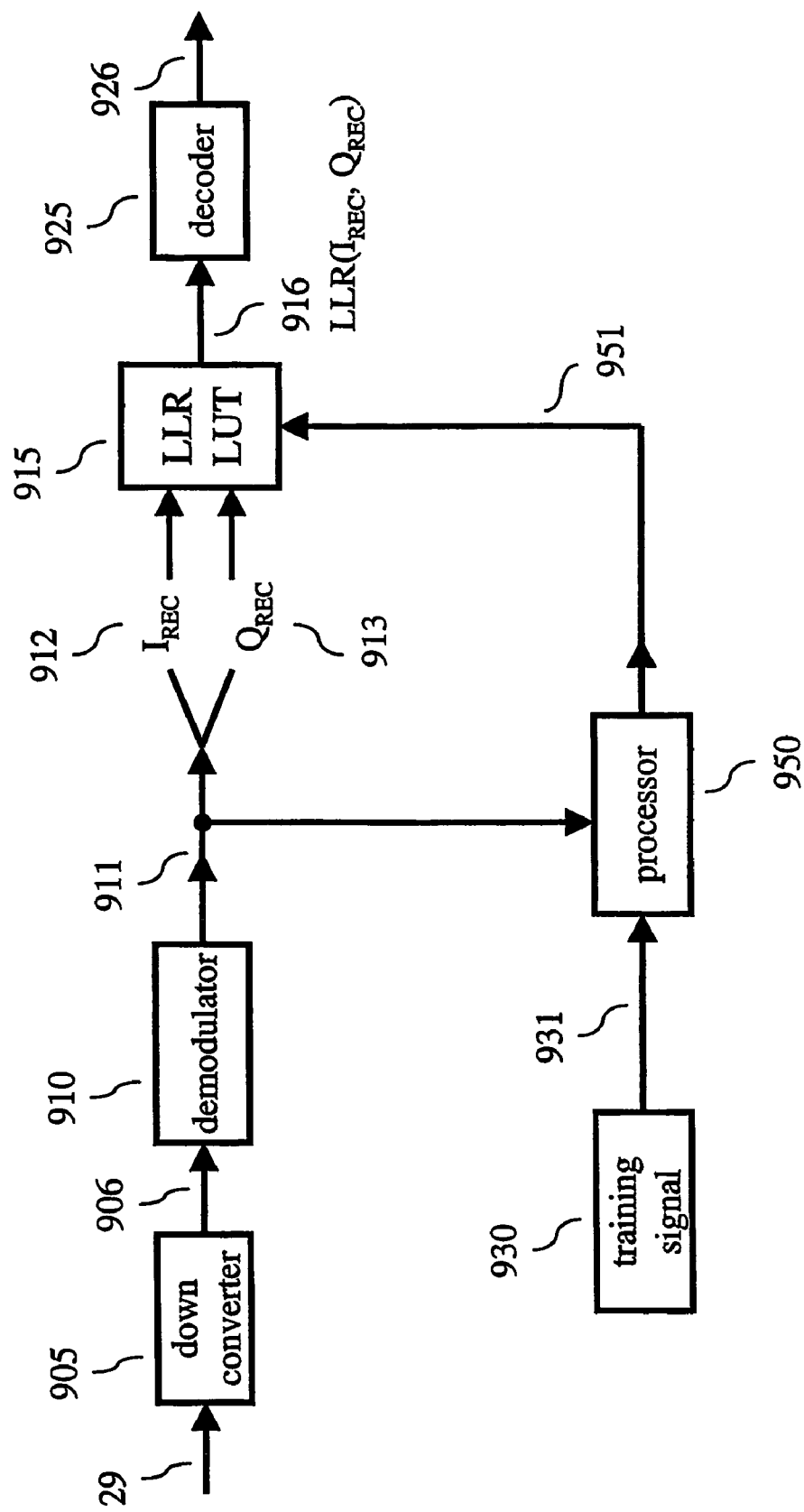
FIG. 16 shows another illustrative embodiment in accordance with the principles of the invention for use in receiver 30 of FIG. 1.
Figure 17:
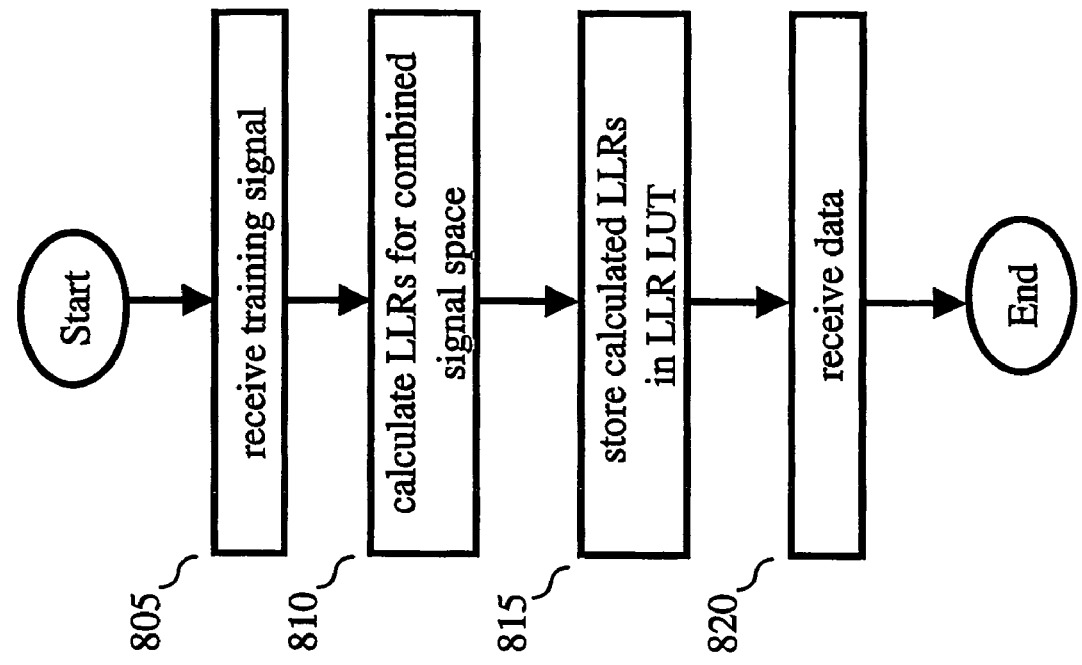
FIG. 17 shows another illustrative flow chart in accordance with the principles of the invention for use in receiver 30 of FIG. 1.

Although described in the context of transmitter S first determining the LLR values to send to receiver 30, this process can also be performed within receiver 30. In this regard, another embodiment for use in receiver 30 is shown in FIG. 16. Receiver 30 includes down-converter 905, demodulator 910, training signal element 930, processor 950, LLR LUT 915 and decoder 925. With respect to receiving data, this embodiment functions as described above (except with respect to mux 960, which is not present). In particular, LLR values from LLR LUT 915 are applied to decoder 925 for recovery of data. With respect to setting values for LLR LUT 915, processor 950 performs the LLR calculations previously performed in transmitter 5. Attention should now be directed to FIG. 17, which shows an illustrative flow chart in accordance with the principles of the invention of a process for use in receiver 30 of FIG. 1. In step 805, receiver 30 begins (or restarts) communications with transmitter 5 and receives a predefined training signal comprising predefined symbols as described above. In step 810, receiver 30 calculates the LLRs (as described above) from the received training signal with respect to predefined training signal (provided by training signal element 930, via signal 931). In step 815, receiver 30 stores the calculated LLRs in LLR LUT 915. Finally, in step 820, receiver 30 switches to a data communications mode and begins to receive data transmitted from transmitter 5 of FIG. 1.

As described above, and in accordance with the principles of the invention, in a communications system, LLR values are transmitted to a receiver based upon an analysis of the expected distortions of the communications channel and the expected values of received symbols. The centers-of-gravity of the expected values of received symbols are illustratively used in the LLR calculation. Alternatively, LLR values are calculated at each receiver, by observing centers-of-gravity of a training sequence of symbols and calculating the LLRs.

In view of the above, it should also be noted that although described in the context of a satellite communications system, the inventive concept is not so limited. For example, although not shown to simplify the description, transmitter 5 may transmit a multi-level signaling scheme such as hierarchical modulation or layered modulation where the corresponding receiver uses soft metrics for recovering data from one or more of the layers. Further, it should also be noted that groupings of components for particular elements described and shown herein are merely illustrative. For example, transmitting ground station 1 may comprise simply transmitting antenna 10 such that transmitter 5 is located further upstream in a distribution system, etc. Likewise, receiver 30 may be located, e.g., at a head-end, which then retransmits the content to other nodes and/or receivers of a network.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor (DSP) or microprocessor that executes associated software, e.g., corresponding to one or more of the steps shown in FIGS. 4 and 5. Further, although shown as separate elements, the elements therein may be distributed in different units in any combination thereof. For example, receiver 30 may be a part of TV 35. It is therefore to be understood that numerous modifications may be made to the illustrative embodiments and that other arrangements may be devised without departing from the spirit and scope of the present invention as defined by the appended claims.

The invention claimed is:

1. A receiver comprising: a demodulator for providing a sequence of signal points from a received signal; a processor for determining soft metric values as a function of the sequence of signal points; a memory for forming a look-up table of the soft metric values, wherein the look-up-table is addressed as a function of an inphase component and a quadrature component of each of the sequence of signal points to provide a sequence of soft metric values; a decoder for using the sequence of soft metric values for recovering data from a received data signal; and a slicer for providing a sequence of target symbols from the sequence of signal points, and wherein the processor determines the soft metric values as a function of a comparison between the sequence of signal points and the sequence of target symbols.

2. The receiver of claim 1, wherein the soft metric values are log-likelihood ratios.

3. The receiver of claim 1, wherein the received signal comprises a training signal and a data bearing signal.

4. A method for use in a receiver, the method comprising:
   demodulating a received signal with a demodulator for providing a sequence of signal points;
   determining with a processor soft metric values as a function of the sequence of signal points;
   storing in a memory the determined soft metric values in a look-up-table, wherein the stored look-up-table is addressed as a function of an inphase component and a quadrature component of each of the sequence of signal points for reading out the determined soft metric value of the stored look-up-table to provide a sequence of soft metric values; and using the sequence of soft metric values in a decoder during decoding for recovering data from a received data signal;
   wherein the determining step includes slicing with a slicer the sequence of signal points for providing a sequence of target symbols; and determining with the processor the soft metric values as a function of a comparison between the sequence of signal points and the sequence of target symbols.

5. The method of claim 4, wherein the soft metric values are log-likelihood ratios.

6. The method of claim 4, wherein the received signal comprises a training signal and a data bearing signal.

* * * * *